United States Patent [19]

Cadwell et al.

[11] Patent Number: 4,738,135

[45] Date of Patent: Apr. 19, 1988

[54] METHOD AND APPARATUS FOR IN SITU ASSEMBLAGE OF A STRAIN SENSOR IN ERECTED STRUCTURAL ELEMENTS

[75] Inventors: Lawrence O. Cadwell, Mahtomedi; Paul T. Schneider; Bradley C. Boyle, both of St. Paul, all of Minn.

[73] Assignee: Ramsey Engineering Company, St. Paul, Minn.

[21] Appl. No.: 941,720

[22] Filed: Dec. 15, 1986

[51] Int. Cl.⁴ .............................................. G01M 5/00
[52] U.S. Cl. ..................................................... 73/786
[58] Field of Search ..................... 73/786, 768; 29/595; 408/72 R

[56] References Cited

U.S. PATENT DOCUMENTS

| | | | |
|---|---|---|---|
| 1,962,241 | 6/1934 | Hawkinson | 408/72 R |
| 2,428,201 | 9/1947 | Cannarili et al. | 408/72 R |
| 3,661,469 | 5/1972 | Leff et al. | 408/72 R |
| 4,520,039 | 7/1985 | Cellon et al. | 73/786 |
| 4,526,044 | 7/1985 | Moser et al. | 73/768 |
| 4,530,245 | 7/1985 | Jacobson | 73/768 |

FOREIGN PATENT DOCUMENTS

| | | | |
|---|---|---|---|
| 237578 | 10/1960 | Australia | 408/72 R |
| 424054 | 4/1924 | Fed. Rep. of Germany | 408/72 R |
| 0661420 | 11/1951 | United Kingdom | 408/72 R |

*Primary Examiner*—Stewart J. Levy
*Assistant Examiner*—Robert R. Raevis
*Attorney, Agent, or Firm*—Norvell & Associates

[57] ABSTRACT

A method and apparatus for in situ drilling of a precise hole in an erected structural element and inserting in such hole in pressed-fit relationship a cylindrical strain gauge. A guide block is provided having a precision hole corresponding to the diameter of the hole desired in the structural element. The guide block has unthreaded bolt holes for attachment of the guide block to the structural element and guides a reamer to produce a precise hole in the structural element. The guide block also has threaded holes for advancing a push plate against a force-transmitting bushing which is insertable through the precision hole in the guide block into abutting relationship with an end face of a cylindrical strain gauge to force the gage into press-fit relationship with the precise hole in the erected structural element.

7 Claims, 4 Drawing Sheets

METHOD AND APPARATUS FOR IN SITU ASSEMBLAGE OF A STRAIN SENSOR IN ERECTED STRUCTURAL ELEMENTS

BACKGROUND OF THE INVENTION

1. Field of the Invention

The invention relates to a method and apparatus for effecting the press-fit assemblage of a generally cylindrical strain sensor in, for example, an erected steel column or other structural element in which in situ stress measurements are desired. In accomplishing this objective, the invention also provides a method and apparatus for effecting the drilling and finishing of a hole in a structural element to precise dimensions through the utilization of hand-held tools.

Description of the Prior Art

Strain sensor elements capable of developing an electrical signal when subjected to compressive or tensile stress have long been known in the art. In recent years, such strain sensor elements have been incorporated in generally cylindrical metallic shells which are then press fitted into a hole provided in a portion of a metallic structural element in which stress determinations are desired. The press fit is necessary in order that the stress existing in the structural element will be transmitted to the strain sensors, which are mounted within the interior of the cylindrical element. A typical strain gauge construction of this type is shown in U.S. Pat. No. 4,530,245 to JACOBSON.

If the cylindrical strain gauge is assembled in the structural steel element prior to the incorporation of the structural steel element in a building or other structure, there is no particular problem involved in utilizing existing types of precision boring or drilling machines for fabricating a precise hole through the portion of the structural steel element wherein stress measurements are desired. Once, however, the structural steel element is erected, it is a matter of some difficulty to produce by hand-held tools, a bore through any portion of an erected structural steel element which will be sufficiently true and of the proper diameter to ensure that a snug press-fit of the cylindrical strain gauge element can be effected. Additionally, the press-fit insertion of the cylindrical strain gauge element into any such hole presents a second problem because the sensor element is of fairly delicate construction and must be protected from abuse. Driving the cylindrical shell into the hole with a hammer would not be a satisfactory method of press-fit insertion. The insertion problem is further complicated by the fact that each cylindrical strain gauge element inherently has one or more pairs of electrical conductors coming out of the element to transmit the electrical signals generated by the strain gauge sensor elements to suitable amplifying, indicating or recording devices.

The prior art has not provided a satisfactory solution for effecting the drilling of a precise hole in an installed structural steel element, and then press-fitting a cylindrical strain gauge sensor in such hole without damage and solely through the utilization of hand-held tools.

SUMMARY OF THE INVENTION

This invention provides a method and apparatus for first accomplishing the in situ drilling of a precise diameter hole in an installed structural steel element or similar metallic element, for which a stress determination is desired, and then secondly, effecting the press-fit insertion of a cylindrical strain gauge in such precise hole without exerting impact forces on the strain gauge, and accomplishing both operations solely by hand-held tools.

A guide block is fabricated having opposed parallel planar end faces, either which is abuttable with a planar portion of a structural steel element. In the case of I-beams or channel beams, such planar portion is generally found on the web portion of the channel or I-beam, and either of the planar faces of the guide block is abuttable with that area of such web portions wherein the most uniform stress concentrations are normally experienced. The guide block is provided with a central guide hole which is perpendicular to the planar end faces and has a diameter closely conforming to, but not less than, the desired diameter of the precision hole to be fabricated in the structural steel element. The central guide hole has a counterbore opening in one planar end face.

The guide block is also provided with a pair of spaced unthreaded holes which are traversable by a pair of bolts for securing the guide block rigidly to the planar portion of the structural steel element. Additionally, the guide block is provided with a pair of spaced threaded bolt holes for a purpose to be later described.

The next step of the novel process involves making a template having center punch hole locations respectively corresponding to the axes of the central hole in the guide block and the two unthreaded bolt holes. Such template is placed snugly against a planar surface of that portion of the structural steel element wherein stress determination is desired, and the locations of the axes of the holes are marked on such planar portion by a center punch.

Holes are then drilled by a hand-held drill at the locations of the center punches. The hole drilled at the location corresponding to the central guide hole in the guide block is drilled out to a diameter which is at least 0.010-inch less than the desired final diameter. The holes drilled at the location of the bolt holes are drilled to the same diameter as the unthreaded bolt holes provided in the guide block. Thus, the guide block may be firmly secured to the planar portion of the structural steel element by passing bolts through the unthreaded bolt holes and the corresponding holes produced in the planar portion of the structural steel element and applying nuts and suitable lock washers to the projecting ends of such bolts. The non-counterbored planar end face preferably abuts the planar portion.

A counter bore reamer, having a maximum diameter equal to the desired diameter of the precision hole to be formed in the structural steel element, is then passed through the guide hole in the guide block and operates on the pilot hole produced by the previous drilling operation, enlarging such hole to precisely the desired diameter and, through the utilization of the guide block, providing a highly accurate alignment of the axis of the precision hole in perpendicular relationship to the planar portion of the structural steel element in which it is formed.

The guide block is then detached from the structural steel element and a cylindrical strain gauge or sensor unit is partially inserted in such precision hole. Such partial insertion is due to the construction of the cylindrical strain gauge element with a central enlarged-diameter portion for which the press-fit engagement with the precision hole is to be effected and a smaller diameter portion on each end thereof.

The guide block is then reassembled to the web portion of the structural steel element in reversed position so that the counterbore is adjacent the planar portion. The projecting end of the cylindrical strain gauge is freely received within such counterbore. The electrical leads for the sensor elements of the strain gauge are passed through the guide hole in the guide block.

A hollow force-transmitting bushing is then slipped over the electrical leads and slidably inserted through the guide hole in the guide block to abut the end face of the cylindrical strain gauge. A push plate is provided having a central hole, through which the electrical leads are passed, and two spaced holes which are respectively aligned with the threaded holes provided in the guide block. Bolts are then passed through suitable holes in the push plate to engage the threaded holes in the guide block, and the tightening of such bolts will gradually force the thrust-transmitting bushing towards the structural steel element and thus force the cylindrical strain gauge into press-fitting relationship with the precision hole previously formed in such structural steel element.

In a modification of this invention, the guide block is contoured to accurately abut a structural element having a cylindrical exterior surface, such as a tank or tubular support element.

All of the heretofore described operations are performed by hand-held tools, yet the diameter of the finished hole in the structural steel element in which the cylindrical strain gauge is press-fitted is fabricated with a high degree of accuracy both in dimension and in the perpendicular alignment of the axis of such hole with the planar portion of the structural steel element in which the hole is fabricated. Moreover, the cylindrical strain gauge element is gradually forced into press-fitted relationship with the precision finished hole and not subject to any impact stresses which could damage the sensitive strain-responsive sensor elements incorporated in the gauge.

Other advantages of the invention will be readily apparent to those skilled in the art from the following detailed description, taken in conjunction with the annexed sheets of drawings, on which is shown a preferred embodiment of the invention.

DESCRIPTION OF PREFERRED EMBODIMENT

Figure 1:
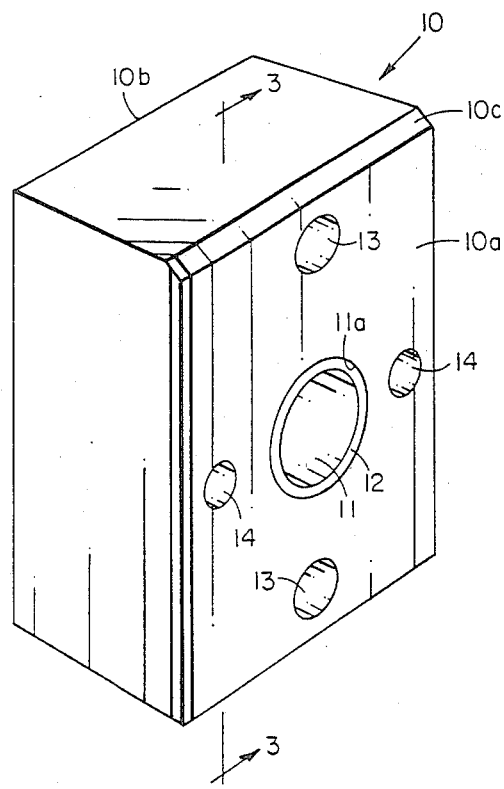
FIG. 1 is a perspective view of a guide block constructed in accordance with this invention.
Figure 2:
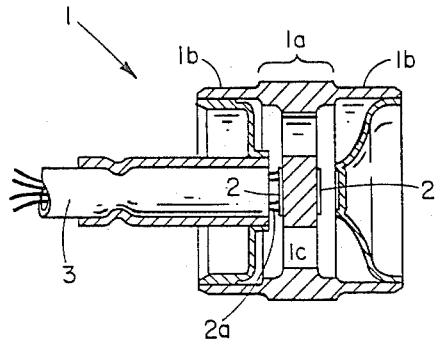
FIG. 2 is an enlarged-scale sectional view of a strain gauge element which is required to be press-fitted in a precise hole in the web portion of an erected structural steel element.
Figure 3:
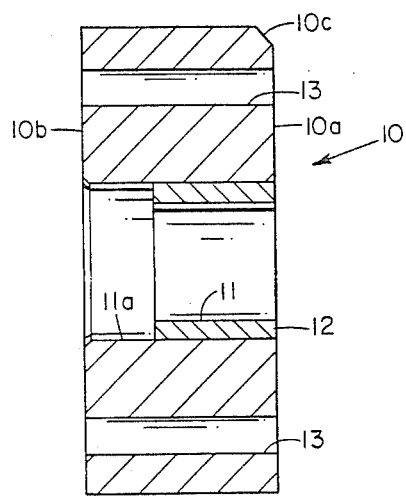
FIG. 3 is a sectional view taken on the plane 3—3 of FIG. 1.

The method and apparatus of this invention is expeditiously employed in the in situ mounting of a generally cylindrical strain gauge 1 (FIG. 2) in press-fit relationship to a hole provided in a structural element, such as an I-beam or an H-beam. Strain gauge element 1 has an enlarged, knurled body portion 1a which is press-fitted within the hole to be precisely formed in the structural element. Adjacent the enlarged central diameter portion 1a are two reduced-diameter end portions 1b, permitting the ready insertion of the end portions in the larger diameter precise hole. Within the interior of the cylindrical element 1, the strain gauge unit is provided with a generally radial transverse web portion 1c on which are mounted one of more sensor elements 2 having electrical leads 2a which translate electrical signals generated by such sensor units to a conventional amplifying and indicating circuit. A plastic tube 3 surrounds leads 2a. The strain gauge 1 preferably comprises a gauge similar to that shown in the aforementioned U.S. Pat. No. 4,530,245. The apparatus embodying this invention comprises a generally rectangular guide block 10 having opposed planar faces 10a and 10b perpendicularly traversed by a central hole 11 formed therethrough which is reamed to a diameter not less than the diameter of the precise hole to be formed in the structural steel element, and preferably not more than 0.001–0.003-inch greater than such diameter. Additionally, one end of the central hole 11 is provided with an enlarged counterbore 11a (FIG. 3) which is of sufficiently large diameter to freely surround the enlarged-diameter central portion 1a of the cylindrical strain gauge 1.

The precise diameter hole 11 may conveniently be formed by inserting a piece of precision tubing 12 in pressed-fit relationship to a central hole formed in the guide block 10. As is well known to those skilled in the art, pieces of tubing having precise interior bores are readily available on the market. The counterbore 11a is then defined by the difference in the diameter between the bore of the press-fitted tubing insert 12 and the original diameter of the central mounting hole. In either event, the guide block 10 ends up having a precise diameter guide hole 11 having an enlarged counterbore 11a at one end thereof. A beveled surface 10c is provided on one edge of the guide block 10 to indicate the location of the counterbore 11a.

Guide block 10 is further provided with at least two peripherally spaced unthreaded bolt holes 13 preferably located on opposite sides of the axis of the central guide hole 11. In a plane at right angles to the plane defined by the axes of the unthreaded bolt holes 13, the guide block 10 is further provided with a pair of threaded bolt holes 14 which are disposed on opposite sides of the central guide hole 11 and which do not extend entirely through the guide block.

To practice the method of this invention, a template 15 is prepared having center punch locations 15a and 15b formed thereon which respectively correspond to the location of the axes of the central guide hole 11 and the unthreaded bolt holes 13 formed in the guide block 10.

Figure 4:
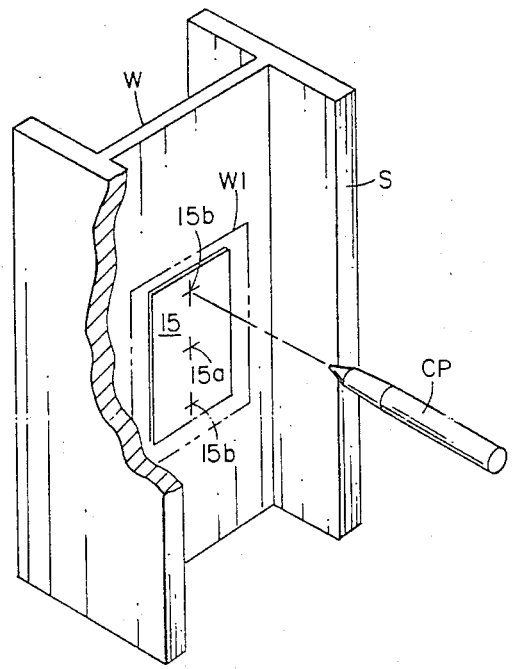
FIG. 4 is a schematic perspective view illustrating the step of locating center punch holes on the web portion of an erected structural steel element.

The location of the stress-determining area of the erected structural steel element S is then determined. Those skilled in the art will recognize that the area of uniform stress generally lies in the web area of a structural I-beam or channel-shaped beam, and such web area W is generally defined by a pair of opposed planar surfaces. One of the planar surfaces is scraped or sanded so as to provide as smooth a surface as is possible with hand-held tools. Such scraped area is indicated as the area outlined by the lines W1 in FIG. 4 of the drawings.

The template 15 is then held in abutment with the scraped area W1 and locating indentations are provided by a center punch CP traversing the template 15 at locations 15a and 15b corresponding to the location of the axes of the central guide hole 11 and the unthreaded bolt holes 13 provided in guide block 10.

Figure 5:
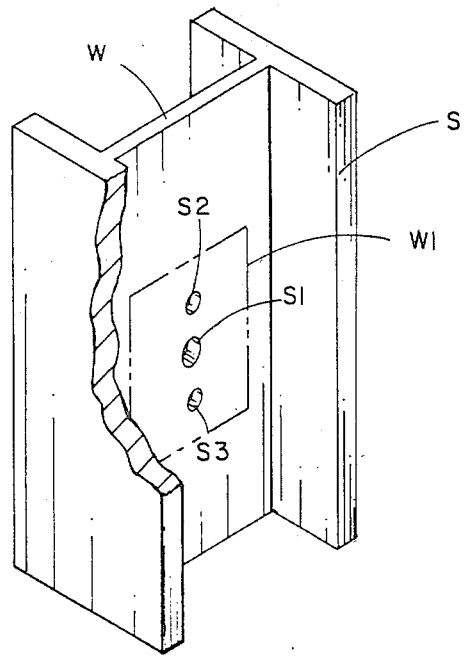
FIG. 5 is a schematic elevational view of the initial holes drilled in the web portion of the erected structural element

Referring now to FIG. 5, holes S1, S2, and S3 are now drilled at the center punch location using a hand-held drill. The diameter of the hole S1, which corresponds in location to the guide hole 11 in the guide block 10, is drilled to a diameter at least 0.010-inch less than the desired precise diameter for achieving a press-fit relationship with the enlarged-diameter central portion 1a of the strain gauge 1. The holes S2 and S3 are drilled to the same diameter as the unthreaded holes 13 provided in the guide block 10 so that these holes are preferably slightly larger in diameter than the bolts 16 (FIG. 6) which are insertable through the unthreaded guide block holes 13 and the web holes S2 and S3 provided in the erected structural steel element.

Figure 6:
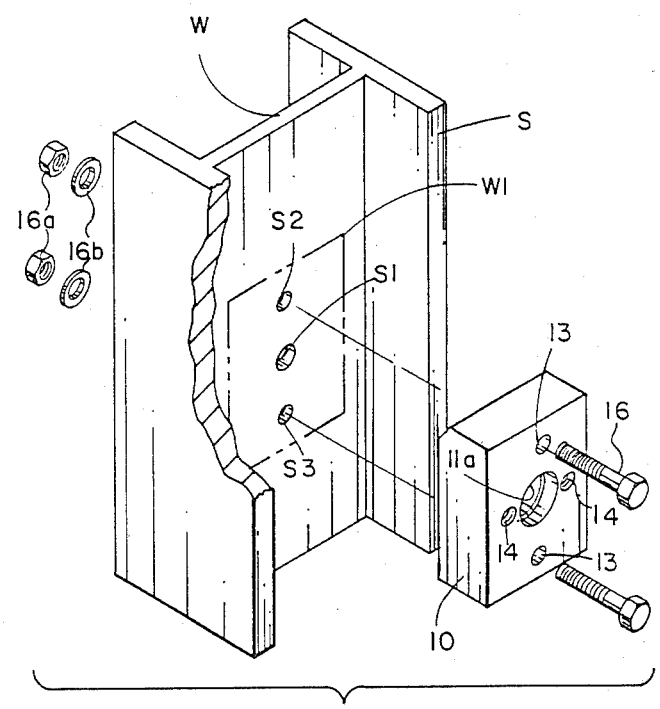
FIG. 6 is an exploded perspective view illustrating the assemblage of the guide block to the erected steel structural element.
Figure 7:
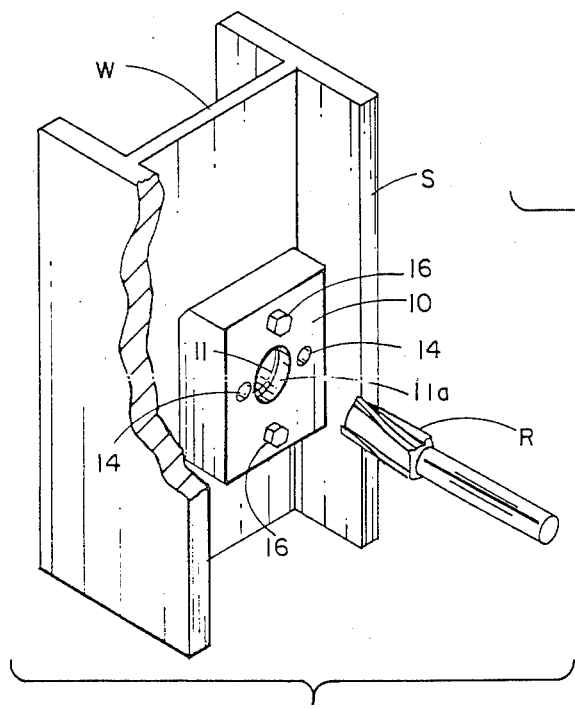
FIG. 7 is a perspective view illustrating the reaming step for finishing a precise mounting hole in the web portion of the erected structural steel element.

Referring now to FIGS. 6 and 7, the guide block element 10 is bolted to the erected structural steel member S by the bolts 16 passing through the aligned holes 13 in the guide block and holes S2 and S3 in the web portion of the structural steel element S. Such bolts are long enough to project entirely through the web portion W of the structural steel element S and are secured by nuts 16a and washers 16b. The guide block 10 is positioned so that the counterbore 11a is disposed outwardly from the scraped surface W1. A precision counterbore reamer R driven by a hand-held tool is then advanced through the guide hole 11 and into engagement with the pilot hole S1 formed in the structural steel element S. Thus the pilot hole S1 will be finished to a precise diameter to achieve the desired degree of interference fit with the maximum diameter portion 1a of the cylindrical strain gauge 1 when such gauge is subsequently inserted in the finished hole S1. Since the reamer R is supported by the precisely finished guide hole 11 in the guide block 10, the finished hole S1 in the web portion of the structural steel element will have a diameter corresponding exactly to the maximum diameter of the precision reamer R and located to a high degree of accuracy in perpendicular alignment with the web portion W of the structural steel element S.

Figure 8:
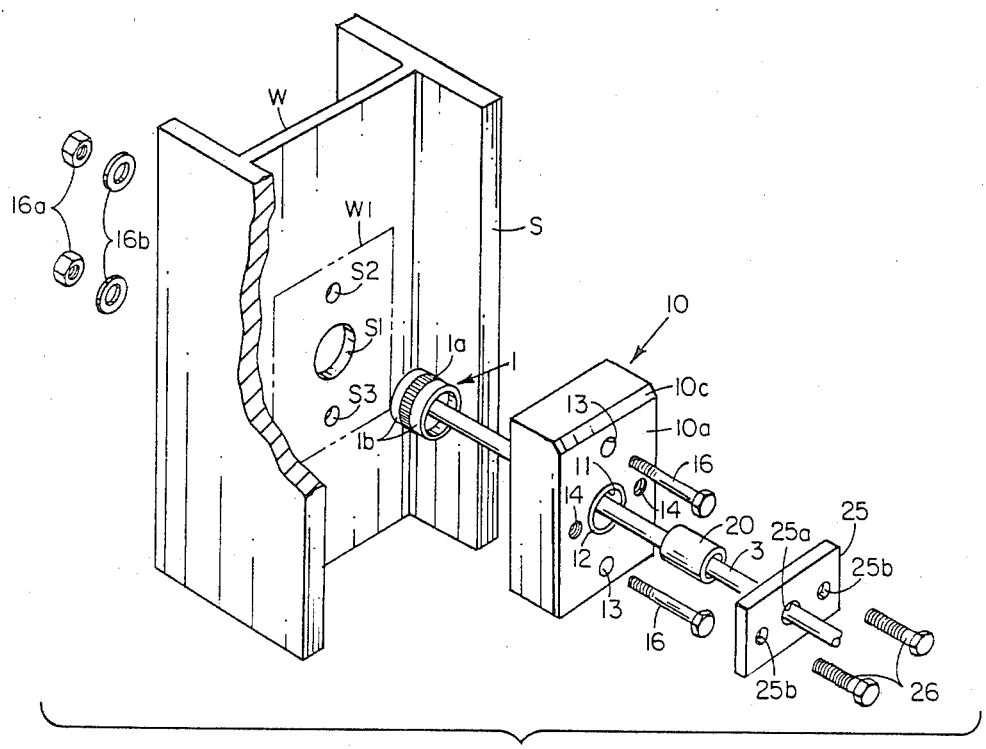
FIG. 8 is an exploded perspective view illustrating the initial positioning of the strain gauge element relative to the guide block and the erected structural steel element.

Referring to FIG. 8, the guide block 10 is now disassembled from the web portion W of the structural steel element S. The large diameter surface of the cylindrical strain gauge unit 1 is generously lubricated so as to facilitate the press-fit insertion of the enlarged diameter portion 1a into the finished hole S1 in the web portion W of the structural steel element S. A reduced diameter end portion 1b of the cylindrical strain gauge element 1 is then inserted in the finished hole S1 and the guide block 10 is reassembled to web portion W, but in a reversed position to that which it previously occupied, so that the counterbore 11a of the guide hole 11 will now freely surround the projecting portions of the partially inserted cylindrical strain gauge unit 1.

The electrical leads 2a coming from the sensor units 2 of the strain gauge element 1 are disposed within a flexible plastic tube 3, and such tube passes freely through the central hole 11 of the guide block 10.

A force-transmitting bushing 20 is provided having an external diameter sized so as to snugly pass through the guide hole 11 in the guide block 10. The sensor lead tube 3 is also inserted through the bore of the force-transmitting bushing 20. The bushing 20 is advanced into the guide block 10 until it abuts the outer end of the cylindrical sensor unit 1.

Figure 9:
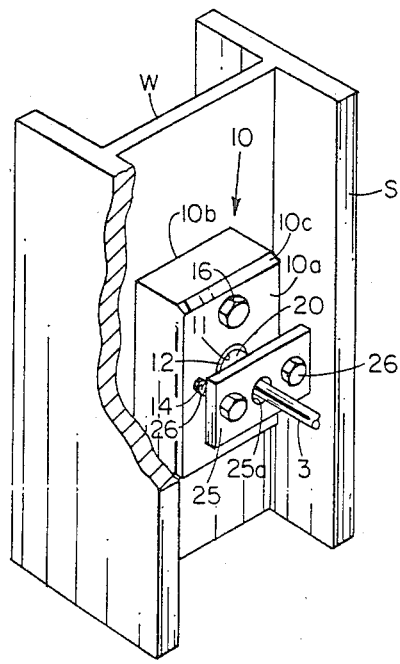
FIG. 9 is a perspective view illustrating the step of press-fitting the cylindrical strain gauge element in the precise hole provided in the web portion of the structural steel element.

A generally rectangular push plate 25 is provided having a central hole 25a large enough to freely receive the plastic tubing 3, but smaller than the internal diameter of the force-transmitting bushing 20. On opposite sides of the central hole 25a, the guide block is provided with a pair of unthreaded bolt holes 25b through which a pair of force-applicating bolts 26 are passed which engage the threaded bolt holes 14 provided in the guide block 10. Thus, the concurrent tightening of the force-applicating bolts 26 will advance the push plate 25 along the axis of the guide hole 11 in guide block 10 and gradually push the force-transmitting bushing 20 and the abutting cylindrical strain gauge unit 1 toward the web portion W of the structural steel element S (FIG. 9). Thus, the strain gauge unit 1 may be inserted in press-fit relationship in the finished hole S1 provided in the web portion W without subjecting the strain gauge unit to any undesirable impact forces or excessive stresses. Once installed in press-fit relationship in the finished hole W1 of the web portion W, the sensors 2 of the strain gauge element 1 will be subjected to the same stresses existing in the web portion W of the structural steel element S and generate electrical signals proportional to such forces which can be amplified and indicated by conventional apparatus.

It should be particularly noted that the entire procedure heretofore described for first establishing a precision diameter hole S1 in the web portion W of an installed structural steel element S, and then inserting a generally cylindrical stress gauge element 1 in press-fit relationship into such hole, can be accomplished entirely by hand-held tools, and hence is suitable for making accurate stress determinations in structural steel elements that are already installed. Of course, after the cylindrical strain gauge unit 1 is installed, the guide block 10 may be removed from the structural steel element and utilized to install other strain gauge units at other locations. The repeated use of the aforedescribed apparatus does not deleteriously effect the accuracy of the press-fitted insertion of the cylindrical strain gauge unit in any installed structural element which is accessible to hand-held tools.

Figure 10:
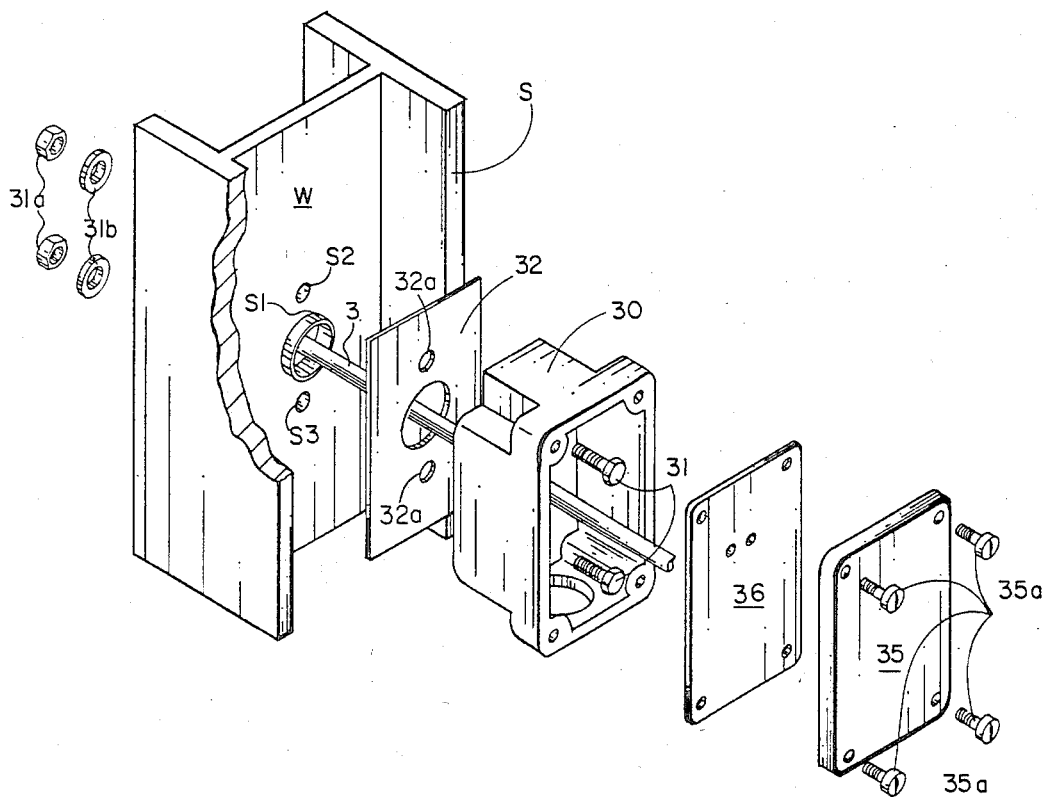
FIG. 10 is an exploded perspective view of a junction box for protecting the strain sensor electrical connections.

If desired, and as illustrated in FIG. 10, a junction box 30 may be installed around the installed strain gauge unit 1 to protect electrical connections to the sensor wires 2a. Such box may be installed by bolts 31 which traverse suitable holes (not shown) provided in the base of the junction box 30, aligned holes 32a provided in a gasket 32, and pass through holes 52 and 53 in the web W and are secured by nuts 31a and washers 31b. A cover plate 35 and gasket 36 may be secured to the opened end of the junction box 30 by a plurality of screws 35a, thus permitting permanently protected electrical connections to be made to the strain gauge unit 1.

Figure 11:
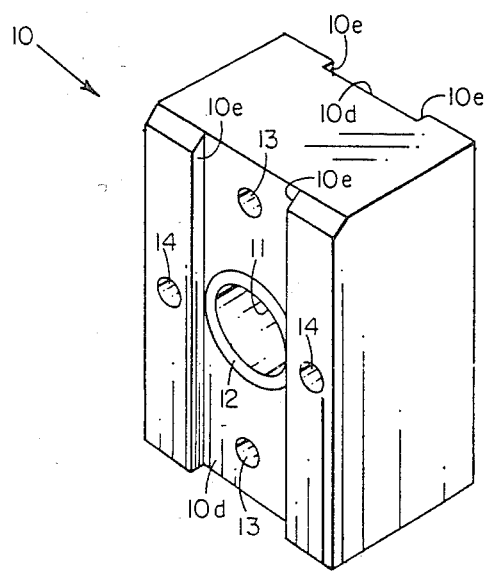
FIG. 11 is a perspective view of a guide block contoured to permit usage with a structural element having a cylindrical surface.

It may be desired to install a strain gauge element in an erected structural element having a cylindrical or curved surface. In such an installation it is desirable that the axis of the cylindrical strain gauge be radially disposed relative to the cylindrical surface. This may be accomplished by the modification of FIG. 11 wherein the surfaces 10a and 10b of the guide block 10 are each provided with a central recess 10d of sufficient depth to permit the remaining edge portions 10e of surfaces 10a and 10b to non-rockably abut the cylindrical or curved surface of the structural element in which the cylindrical strain gauge 1 is to be installed.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. A method of in situ press-fit assembly of a cylindrical strain sensor in a portion of a structural steel element, said cylindrical strain sensor having a central maximum diameter portion and at least one reduced-diameter end portion, comprising the steps of:
   (1) providing a guide block having a central hole with a diameter less than the maximum diameter of the cylindrical strain sensor by an amount equal to the desired press-fit interference, and a counterbore sized to freely receive an end portion of said cylindrical strain sensor therein, a pair of unthreaded bolt holes radially spaced from said central hole, and a plurality of threaded holes disposed in peripherally spaced relation to said central hole;
   (2) fabricating a template having center punch indications respectively alignable with the axes of said center hole and said unthreaded said bolt holes;
   (3) abutting said template with the portion of the structural steel element where stress determination is desired;
   (4) center punching hole locations in said portion through said center punch indications in said template;
   (5) drilling a pilot hole at said center punch location corresponding to said central hole to a diameter less than the maximum diameter of said cylindrical strain sensor:
   (6) drilling holes at each center punch location of said unthreaded bolt holes to a diameter equal to said unthreaded bolt holes;
   (7) securing said guide block to the surface of said portion by bolts snugly traversing said unthreaded holes in said guide block and the aligned holes in said portion of the structural steel element, and securing said bolts with nuts applied to the ends of said bolts projecting through the structural steel element;
   (8) inserting a counterbore reamer through said center hole of said guide block and finishing said pilot hole in said portion of the structural steel element to a diameter less than the maximum diameter of said cylindrical strain sensor by an amount equal to the desired press-fit interference;
   (9) removing said guide block from said portion of the structural steel element;
   (10) inserting a reduced-diameter end portion of said cylindrical sensor in said finished hole in said portion;
   (11) reassembling said guide block to said portion with said maximum diameter portion of said cylindrical sensor disposed in said counterbore;
   (12) inserting a force-transmitting bushing in said central hole in said guide block with one end of said bushing projecting out of said central hole;
   (13) securing a push plate across the projecting end of the said force-transmitting bushing by bolts traversing the push plate and threaded into said threaded holes of said guide block; and
   (14) sequentially tightening said last-mentioned bolts to force said cylindrical strain sensor into said finished hole in the structural steel element in press-fit relationship thereto.

2. The method of claim 1 wherein said cylindrical strain sensor has electrical leads projecting axially therefrom and further comprising the step of passing said electrical leads axially through said central hole and said force-transmitting bushing prior to the press-fitting of said cylindrical strain sensor into said finished hole.

3. Apparatus for producing, in situ, a precise diameter hole in a portion of an installed structural steel element and press-fitting a cylindrical strain gauge sensor in the precise diameter hole, comprising a metallic guide block having a face abuttable with said portion; a central guide hole traversing said guide block in perpendicular relation to said face; said guide hole having a bore diameter substantially equal to but not less than the desired diameter of the hole to be drilled in said portion; a first pair of non-threaded bolt-receiving holes traversing said guide block in perpendicular relation to said face and spaced on opposite sides of said guide hole; a template for center punching said portion at locations corresponding to the axes of said central guide hole and said bolt-receiving holes, whereby a pilot hole and two bolt-receiving holes may be produced in said portion; first bolt means for securing said guide block to said portion by traversing said unthreaded bolt-receiving holes; a counterbore reamer snugly insertable through said central hole to finish said precise diameter hole in said portion; a second pair of threaded holes traversing said guide block in perpendicular relation to said face and peripherally spaced intermediate said first pair of non-threaded holes; a force-transmitting bushing slidably insertable in said guide hole; a pressure plate having two unthreaded holes respectively alignable with said second pair of threaded holes; second bolt means traversing said unthreaded holes in said pressure plate and engaging said second pair of threaded holes; said pressure plate being abuttable with one end face of said force-transmitting bushing, whereby said cylindrical strain sensor may be forced by said bushing into said precise diameter hole in press-fitting relationship therewith by tightening said second bolt means.

4. The apparatus of claim 3 further comprising a counterbore in one end of said central guide hole for receiving an end portion of said cylindrical strain gauge element therein preliminary to the forcing of said cylindrical strain gauge into said precise diameter hole.

5. A method of in situ press-fit assembly of a cylindrical strain sensor in a portion of a structural steel element, said cylindrical strain sensor having a central maximum diameter portion and at least one reduced-diameter end portion, comprising the steps of:

(1) providing a guide block having a central hole with a diameter less than the maximum diameter of the cylindrical strain sensor by an amount equal to the desired press-fit interference, and a counterbore sized to freely receive an end portion of said cylindrical strain sensor therein, a pair of unthreaded bolt holes radially spaced from said central hole, and a plurality of threaded holes disposed in peripherally spaced relation to said central hole;

(2) drilling a pilot hole in said portion and two bolt receiving holes in axial alignment with said central hole and said unthreaded bolt holes in said guide block;

(3) securing said guide block to the surface of said portion by bolts snugly traversing said unthreaded holes in said guide block and the aligned holes in said portion of the structural steel element, and securing said bolts with nuts applied to the ends of said bolts projecting through the structural steel element;

(4) inserting a counterbore reamer through said central hole of said guide block and finishing said pilot hole in said portion of the structural steel element to a diameter less than the maximum diameter of said cylindrical strain sensor by an amount equal to the desired press-fit interference;

(5) removing said guide block from said portion of the structural steel element;

(6) inserting a reduced-diameter end portion of said cylindrical sensor in said finished hole in said portion;

(7) reassembling said guide block to said portion with said maximum diameter portion of said cylindrical sensor disposed in said counterbore;

(8) inserting a force-transmitting bushing in said central hole in said guide block with one end of said bushing projecting out of said central hole;

(9) securing a push plate across the projecting end of the said force-transmitting bushing by bolts traversing the push plate and threaded into said threaded holes of said guide block; and

(10) sequentially tightening said last-mentioned bolts to force said cylindrical strain sensor into said finished hole in the structural steel element in press-fit relationship thereto.

6. The method of claim 5 wherein said cylindrical strain sensor has electrical leads projecting axially therefrom and further comprising the step of passing said electrical leads axially through said central hole and said force-transmitting bushing prior to the press-fitting of said cylindrical strain sensor into said finished hole.

7. Apparatus for producing, in situ, a precise diameter hole in a portion of an installed structural steel element having a curved exterior surface and press-fitting a cylindrical strain gauge sensor in the precise diameter hole, comprising a metallic guide block having a recessed face permitting non-rockable engagement of the guide block with said curved surface; a central guide hole traversing said guide block in perpendicular relation to said face; said guide hole having a bore diameter substantially equal to but not less than the desired diameter of the hole to be drilled in said portion; a first pair of non-threaded bolt-receiving holes traversing said guide block in perpendicular relation to said face and spaced on opposite sides of said guide hole; a template for center punching said portion at locations corresponding to the axes of said central guide hole and said bolt-receiving holes, whereby a pilot hole and two bolt receiving holes may be produced in said portion; first bolt means for securing said guide block to said portion by traversing said unthreaded bolt-receiving holes; a counterbore reamer snugly insertable through said central hole to finish said precise diameter hole in said poriton; a second pair of threaded holes traversing said guide block in perpendicular relation to said face and peripherally spaced intermediate said first pair of non-threaded holes; a force-transmitting bushing slidably insertable in said guide hole; a pressure plate having two unthreaded holes respectively alignable with said second pair of threaded holes; second bolt means traversing said unthreaded holes in said pressure plate and engaging said second pair of threaded holes; said pressure plate being abuttable with one end face of said force-transmitting bushing, whereby said cylindrical strain sensor may be forced by said bushing into said precise diameter hole in press-fitting relationship therewith by tightening said second bolt means.

* * * * *